(12) United States Patent
Jin (10) Patent No.: US 9,356,268 B2
(45) Date of Patent: May 31, 2016

(54) BATTERY MODULE (75) Inventor: Hee-Joon Jin, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 839 days.

(21) Appl. No.: 13/253,862

(22) Filed: Oct. 5, 2011

(65) Prior Publication Data
US 2012/0177979 A1 Jul. 12, 2012

Related U.S. Application Data (60) Provisional application No. 61/431,345, filed on Jan. 10, 2011, provisional application No. 61/432,573, filed on Jan. 13, 2011.

(51) Int. Cl.
H01M 2/18 (2006.01)
H01M 2/10 (2006.01)
H01M 10/647 (2014.01)
H01M 10/6555 (2014.01)
H01M 10/613 (2014.01)
H01M 10/6566 (2014.01)
H01M 10/04 (2006.01)
H01M 10/625 (2014.01)

(52) U.S. Cl.
CPC .......... *H01M 2/1077* (2013.01); *H01M 2/1061* (2013.01); *H01M 10/0413* (2013.01); *H01M 10/5004* (2013.01); *H01M 10/5032* (2013.01); *H01M 10/5055* (2013.01); *H01M 10/5073* (2013.01); *H01M 10/625* (2015.04); *H01M 10/647* (2015.04); *H01M 10/6566* (2015.04)

(58) Field of Classification Search
CPC ............ H01M 2/1061; H01M 2/1077; H01M 10/0413; H01M 10/5073; H01M 10/5032; H01M 10/5004; H01M 10/5055
USPC ........................................................ 429/159
See application file for complete search history.

(56) References Cited

U.S. PATENT DOCUMENTS 7,879,480 B2  2/2011  Yoon et al.
7,981,538 B2  7/2011  Kim et al.
(Continued)

FOREIGN PATENT DOCUMENTS

CN    1808751 A    7/2006
CN   101065862 A   10/2007
(Continued)

OTHER PUBLICATIONS

European Patent Office action dated Apr. 3, 2012, issued to European application No. 12150540.8 (5 pages).
(Continued)

*Primary Examiner* — Jonathan Jelsma
(74) *Attorney, Agent, or Firm* — Lewis Roca Rothgerber Christie LLP (57) ABSTRACT Disclosed is a battery module including a plurality of battery cells arranged in one direction, a barrier disposed between the plurality of battery cells; and a housing accommodating the battery cells and the barrier, wherein the barrier includes at least one linear member having a plurality of protrusions, and first and second lateral members respectively connected to one end portion and another end portion of the linear member, and the first and second lateral members include at least one opening.

16 Claims, 8 Drawing Sheets

(56) References Cited

U.S. PATENT DOCUMENTS

| | | |
|---|---|---|
| 8,652,675 B2 | 2/2014 | Yun et al. |
| 2006/0115720 A1 | 6/2006 | Kim |
| 2007/0285051 A1 | 12/2007 | Jeon et al. |
| 2008/0299449 A1 | 12/2008 | Yun et al. |
| 2009/0111010 A1* | 4/2009 | Okada et al. ................. 429/120 |
| 2010/0310909 A1* | 12/2010 | Yun et al. ........................ 429/90 |
| 2012/0214045 A1* | 8/2012 | Yoon .............................. 429/151 |
| 2013/0330587 A1 | 12/2013 | Takahashi et al. |

FOREIGN PATENT DOCUMENTS

| | | |
|---|---|---|
| CN | 101366132 A | 2/2009 |
| EP | 1 753 058 A2 | 2/2007 |
| JP | 2006-156406 | 6/2006 |
| JP | 2006-260967 | 9/2006 |
| KR | 10-0669414 B1 | 1/2007 |
| KR | 10-0717751 B1 | 5/2007 |
| KR | 10-2007-0117824 | 12/2007 |
| KR | 10-0953614 B1 | 4/2010 |
| WO | WO 2006/068366 A1 | 6/2006 |
| WO | WO 2012/066875 A1 | 5/2012 |

OTHER PUBLICATIONS

SIPO Notice of Allowance dated Oct. 29, 2015, with English translation, for corresponding Chinese Patent application 201110423249. X, (8 pages).

JPO Office action dated Dec. 1, 2015, for corresponding Japanese Patent application 2012-002296, (4 pages).

KIPO Office action dated Jan. 21, 2016, for corresponding Korean Patent application 10-2011-0140163, (10 pages).

* cited by examiner

BATTERY MODULE

CROSS-REFERENCE TO RELATED APPLICATIONS

This application claims the benefit of U.S. Provisional Application Nos. 61/431,345, filed on Jan. 10, 2011, and 61/432,573, filed Jan. 13, 2011, in the United States Patent and Trademark Office, the disclosures of which are incorporated herein in their entirety by reference.

BACKGROUND OF THE INVENTION

1. Field

The embodiment relates to a battery module.

2. Description of Related Art

Recently, a high-output battery module using a high energy density nonaqueous electrolyte has been developed, and the high-output battery module is realized by a high-capacity battery module formed by connecting a plurality of battery cells in series so that the battery module can be used for devices requiring high power, for example, a driving motor of an electric car.

A battery cell typically includes an electrode assembly formed of a positive plate and a negative plate, and an electrolyte, and generates energy through an electrochemical reaction between the plates and the electrolyte. Gas may be generated in the battery cell due to a side reaction of the electrochemical reaction.

The gas may deform an external appearance of the battery cell to affect a shape of the battery module including the plurality of arranged battery cells, thereby causing instability among the battery cells.

SUMMARY

An aspect of the present invention is to provide a new type of a barrier to provide a battery module which decreases in volume and becomes light.

Another aspect of the present invention is to provide a battery module having a barrier to efficiently provide a channel of a heat transmission medium.

According to an aspect of the present invention, there is provided a battery module including a plurality of battery cells arranged in one direction, a barrier disposed between the plurality of battery cells; and a housing accommodating the battery cells and the barrier, wherein the barrier includes at least one linear member having a plurality of protrusions, and first and second lateral members respectively connected to one end portion and another end portion of the linear member, and the first and second lateral members include at least one opening.

The housing may include a pair of first and second end plates disposed outside the battery cells and a connecting member connecting the first and second end plates.

Here, the connecting member may include side plates supporting opposite sides of the battery cells and a bottom plate supporting a bottom side of the battery cells.

The linear member may have a length corresponding to a width of the battery cells, and the protrusions may be spaced at regular intervals on the linear member.

A plurality of linear members may be arranged side by side and spaced regular intervals in a lengthwise direction of the battery cells.

The protrusions may have a round or polygonal tube shape.

The opening may be formed in a portion of the first or second lateral member which is not connected to the one end portion and the other end portion of the linear members.

The first or second lateral member may be disposed in the lengthwise direction of the battery cells and be connected vertically to the linear members.

The first or second lateral member may be a rectangular plate to face a lateral side of the battery cells.

The plurality of linear members may be spaced and connected in a lengthwise direction of the first or second lateral member, and be disposed in a central position of the first or second lateral member.

The opening may include a plurality of holes spaced in the lengthwise direction of the first or second lateral member.

The barrier may further include a lower member connecting the first and second lateral members and formed corresponding to the bottom side of the battery cells.

The lower member may be formed to extend from the first and second lateral members and have the same width as the first and the second lateral members.

Here, the lower member may further include a guide part projecting upwards in a central portion of the lower member.

Further, the guide part may be disposed parallel with the linear members and connect one end portion of the first lateral member to one end portion of the second lateral member.

The barrier may further include an upper member connecting the first and second lateral members and formed corresponding to a cap assembly of the battery cells.

The first or second lateral member may be disposed corresponding to the lateral sides of the battery cells and be bent at an upper edge of the battery cells to extend to cover part of the cap assembly of the battery cells.

As described above, according to exemplary embodiments of the present invention, a battery module uses a novel barrier, so that the battery module decreases in volume and becomes light.

According to exemplary embodiments of the present invention, a battery module has a barrier to efficiently provide a channel of a heat transmission medium between battery cells.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Hereinafter, exemplary embodiments of the present invention are described with reference to the accompanying drawings.

Figure 1:
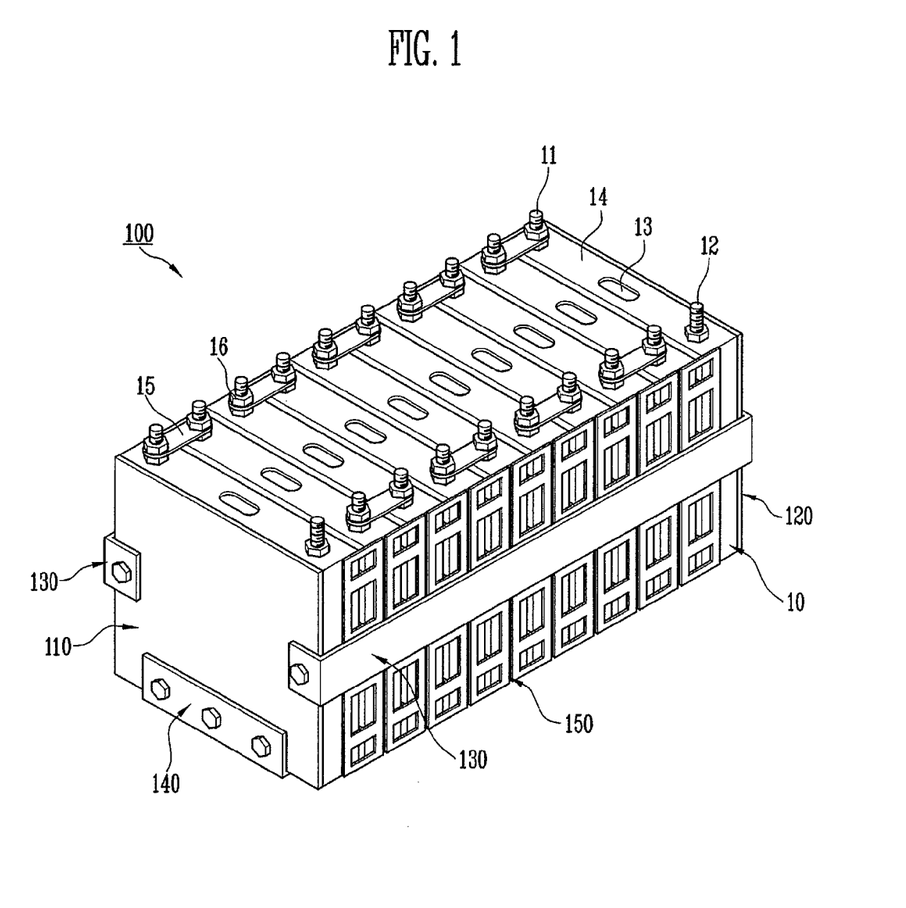
FIG. 1 is a perspective view of a battery module according to an exemplary embodiment of the present invention.
Figure 2:
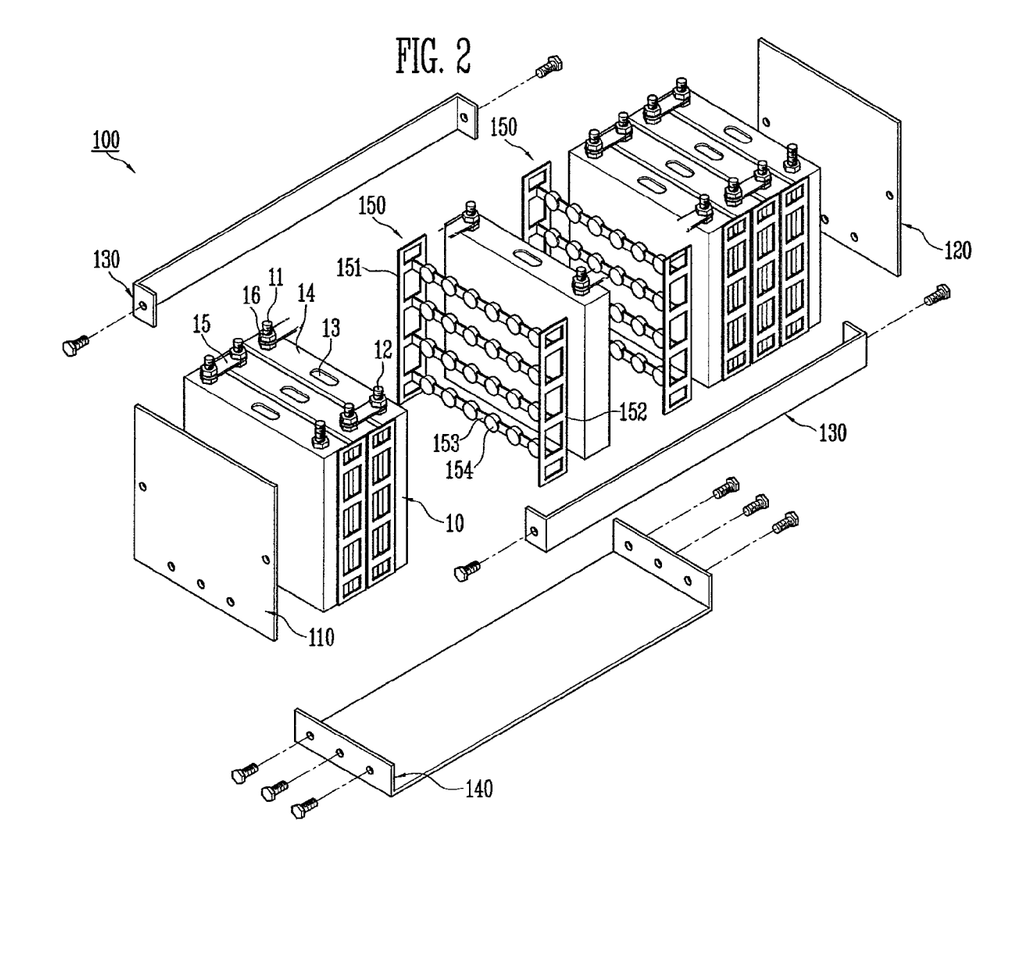
FIG. 2 is an exploded perspective view of the battery module of FIG. 1.

FIG. 1 is a perspective view of a battery module according to an exemplary embodiment of the present invention, and FIG. 2 is an exploded perspective view of the battery module of FIG. 1.

Referring to FIGS. 1 and 2, the battery module 100 according to the exemplary embodiment of the present invention includes a plurality of battery cells 10 stacked together, a barrier 150 located between adjacent battery cells 10, and a housing 110, 120, 130, and 140 accommodating the battery cells 10 and the barriers 150. The barriers 150 includes at least one linear member or bridge 153 having a plurality of protrusions 154, and a first lateral member 151 and a second lateral member 152 respectively connected first and second end portions of the linear member 153, wherein the first and second lateral members 151 and 152 each include at least one opening.

The battery cells 10 may be formed by accommodating an electrode assembly and an electrolyte in a battery case and sealing the battery case with a cap assembly 14, wherein a bottom surface of the battery case is generally opposite to the cap assembly. The cap assembly 14 may include a positive terminal 11 and a negative terminal 12 which are formed on opposite end portions of the cap assembly 14 and a vent 13 formed between the terminals 11 and 12. The electrode assembly may include a positive plate, a negative plate, and a separator located between the plates. The positive plate is connected to the positive terminal 11, and the negative plate is connected to the negative terminal 12 so that energy generated by an electrochemical reaction of the electrode assembly and the electrolyte is transmitted to the outside. Further, the vent 13 functions as a path through which gas generated in the battery cell 10 is discharged to the outside.

The housing 110, 120, 130, and 140 fixes the plurality of battery cells 10 and the barrier 150 to form the battery module 100. The housing 110, 120, 130, and 140 may be formed of a pair of first and second end plates 110 and 120 located at opposite ends of the stacked battery cells 10, and a connecting member 130 and 140 coupled to and extending between the first and second end plates 110 and 120.

The first and second end plates 110 and 120 and the connecting member 130 and 140 form a space to accommodate the battery cells 10, and the battery cells 10 are stacked in one direction in the formed space. In one embodiment, the battery cells 10 are arranged side by side with wider front sides facing each other. The positive terminal 11 or the negative terminal 12 of two neighboring battery cells 10 may be electrically connected through a bus bar 15. The bus bar 15 includes holes through which the positive terminal 11 and the negative terminal 12 pass, and the bus bar 15 may be fixed by a nut 16 or the like with the positive terminal 11 and the negative terminal 12 passing through the hole and being connected.

The connecting members 130 and 140 may include a pair of side plates 130 to support opposite lateral sides of the battery cells 10, and a bottom plate 140 to support a bottom side of the battery cells 10. The pair of side plates 130 support the opposite lateral sides of the battery cells, 10, and the bottom plate 140 supports the bottom side of the battery cells 10. One end portion of the side plates 130 and the bottom plate are respectively coupled with the first end plate 110, and another end portion thereof are coupled with the second end plate 120, so that the first and second end plates 110 and 120 are connected to each other. Here, coupling is made through a bolt and a nut, but is not limited thereto.

The first and second end plates 110 and 120 are in surface contact with battery cells 10 at opposite ends to press the plurality of battery cells 10 inwards (i.e., to compress the battery cells together). The battery cells 10 supported by the first and second end plates 110 and 120 are arranged with the positive terminals 11 and the negative terminals 12 being alternately oriented so that neighboring terminals are connected in series.

The first and second end plates 110 and 120, the pair of side plates 130, and the bottom plate 140 are provided to stably fix the battery cells 10, may be modified, and are not limited to a configuration in the present embodiment. Further, a connection structure and a number of battery cells 10 may be changed based on a desired design of the battery module 100.

Figure 3:
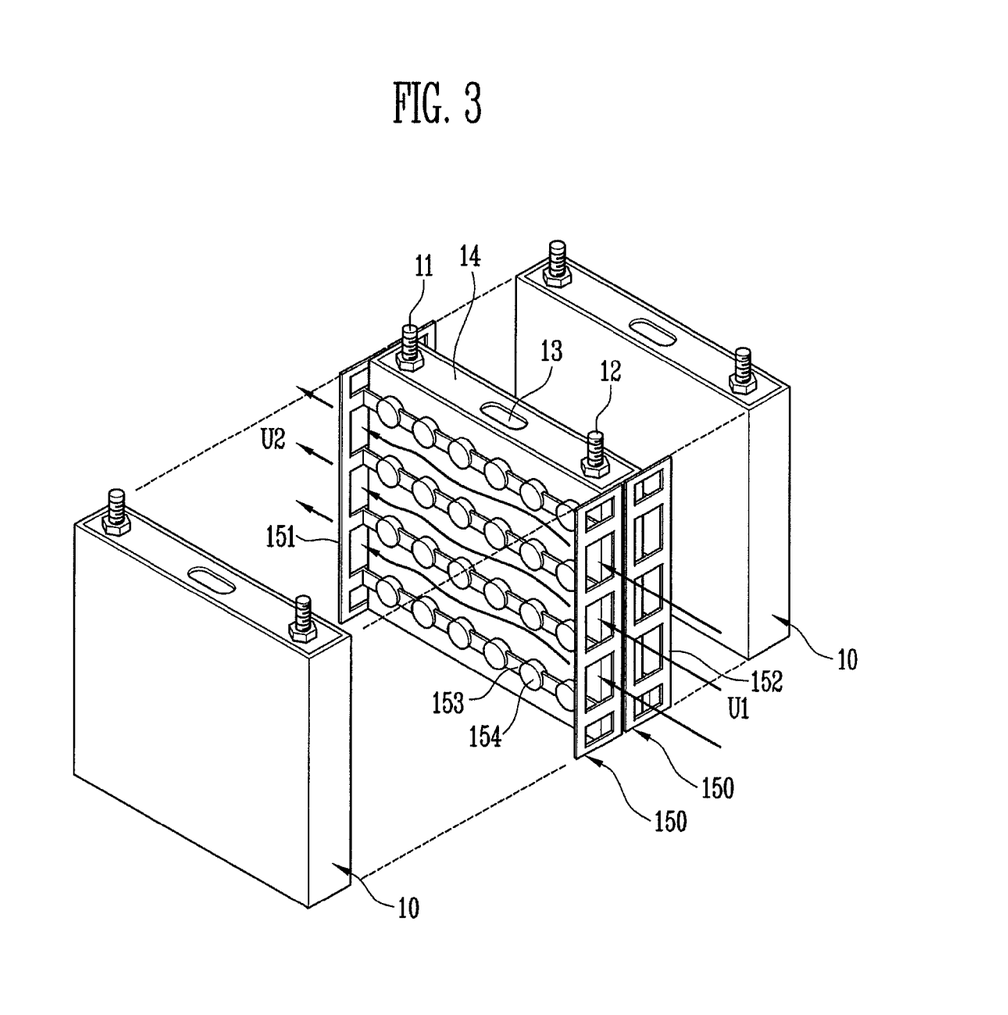
FIG. 3 is a perspective view of a barrier located between battery cells according to an exemplary embodiment of the present invention.
Figure 4A:
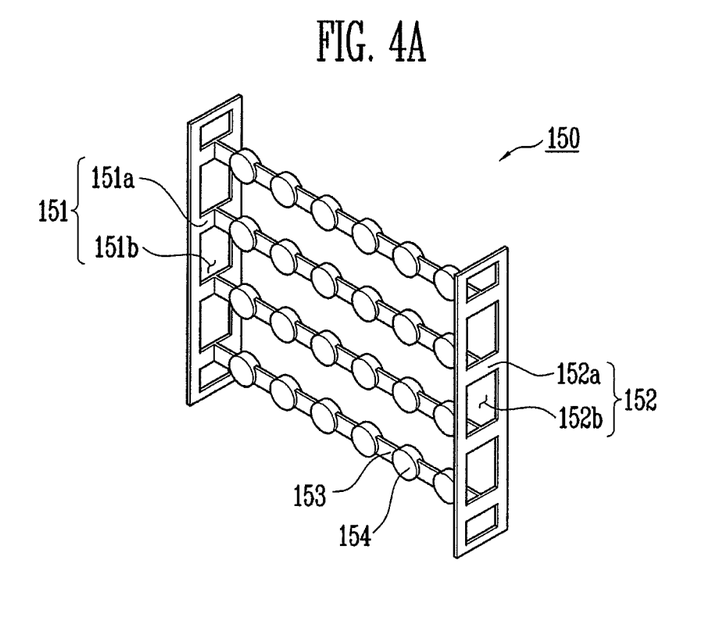
FIG. 4A is a perspective view of the barrier according to an exemplary example of the present invention.
Figure 4B:
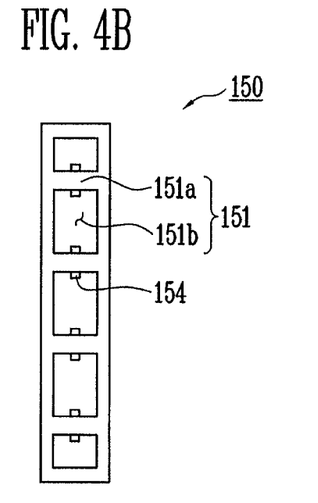
FIG. 4B is a lateral view of the barrier according to the exemplary embodiment of the present invention.

FIG. 3 is a perspective view of a barrier located between battery cells according to an exemplary embodiment of the present invention, FIG. 4A is a perspective of the barrier according to the exemplary example of the present invention, and FIG. 4B is a lateral view of the barrier according to the exemplary embodiment of the present invention.

Referring to FIGS. 3 to 4B, the barrier 150 located between the battery cells 10 includes the at least one linear member 153 having the protrusions 154, and the first and second lateral members 151 and 152 respectively connected to end portions of the linear member 153. The first and second lateral members 151 and 152 may include at least one opening 151*b* and 152*b*. In addition, the first and second lateral members 151 and 152 are oriented to be parallel with each other in a lengthwise direction of the battery cells 10 to be connected vertically to the linear member 153.

The linear member 153 may have a length generally corresponding to a width of the battery cells 10, and the protrusions 154 may be spaced at regular intervals on the linear member 153. Further, a plurality of linear members 153 may be arranged side by side and spaced at regular intervals in the lengthwise direction of the battery cells 10.

The barrier 150 is located between neighboring battery cells 10 and spaces the battery cells 10 from each other. Thus, a space may be formed between the battery cells 10 due to the barrier 150. The space may function as a heat discharge path so that heat generated in the battery cells 10 due to numerous charging and discharging cycles does not accumulate. Further, the space may serve as a path U1 and U2 of a heat transmission medium for cooling or heating the battery cells 10. In other words, the heat transmission medium is introduced from one side U1 of the battery module 100, passes through the space formed by the barrier 150 to exchange heat being in direct contact with a wider side of the battery cells 10, and is discharged to another side U2 of the battery module 100 so that the battery cells 10 maintain a certain temperature.

Generally, a barrier includes a plate member corresponding to a battery cell and a protrusion formed on the plate member. The plate member is oriented to face a wide front side of the battery cell, and only a space between the protrusions functions as a traveling path of a heat transmission medium. However, in the present invention, the barrier includes the linear member and the protrusions formed on the linear member. Thus, unlike the general plate member, not only the space formed by the battery cells and the protrusions but a space between linear members functions as the path of the heat transmission medium. Accordingly, with the same volume, a battery module using the barrier according to the present invention has an increased traveling path of the heat transmission medium to effectively heat or cool the battery cells within a short time. Moreover, heat exchange efficiency of the battery cells is improved to use less heat transmission media, thereby reducing manufacturing costs. In addition, the weight of a battery module of embodiments of the present invention is minimized compared to a battery module using a barrier having the general plate member.

Referring to FIGS. 4A and 4B, the barrier 150 may include the first or second lateral member 151 or 152 connecting the linear members 153, and the first or second lateral member 151 or 152 may be a rectangular plate facing a lateral side of the battery cells 10. The first or second lateral member 151 or 152 may be configured to accommodate the spaced plurality of linear members 153 in lines. Furthermore, the first or second lateral member 151 or 152 may have a shape generally corresponding to the lateral side of the battery cells 10 to provide a basic frame of the barrier 150.

In the barrier 150, the linear members 153 are oriented to generally correspond to the wider side of the battery cells 10, and the first or second lateral member 151 or 152 is oriented to generally correspond to opposite sides of the battery cells 10. For example, the plurality of linear members 153 may be connected to the first or second lateral member 151 or 152, being spaced along a lengthwise direction of the first and second lateral members 151 and 152, and extending between the first and second lateral members 151 and 152. Thus, the linear members 153 and the first or second lateral member 151 or 152 may be connected to each other such that the linear members extend between the first and second lateral members 151 and 152.

Generally, the plurality of battery cells 10 are fixed via connection of a component, such as a bracket or a plate, not using an integrated housing, for minimizing weight, but these components do not secure the battery cells 10 as well as the integrated housing. In one embodiment, more components are used in order to compensate for the reduced security. In this case, security of the battery cells 10 may be maximized, while weight may be minimized compared to the integrated housing. Thus, in order to make the housing light and to securely fix the battery cells 10, the first or second lateral member 151 or 152 of the barrier 150 may be a rectangular plate facing the lateral side of the battery cells 10. Here, the first or second lateral member 151 or 152 is connected approximately vertically (i.e., at about a right angle) to the linear members 153, thereby further securely fixing the battery cells 10.

Further, the first or second lateral member 151 or 152 may include at least one opening 151b and 152b, and the opening 151b and 152b may function as an inlet or outlet of the heat transmission medium. The opening 151 may be formed in a portion of the first or second lateral member 151 or 152 which is not connected to either end portion of the linear members 153.

In the present embodiment, in order to maintain the form of the barrier 150, the one end portion of the linear members 153 is connected and coupled to the first lateral member 151, and the other end portion thereof is connected and coupled to the second lateral member 152. Coupled portions are referred to as connecting parts 151a and 152a, and the connecting parts 151a and 152a may be formed to correspond to end portions of the linear members 153. In other words, a length of the connecting parts 151 a and 152a may correspond to a length of the end portions of the linear members 153. Further, the opening 151b and 152b is formed in a portion excluding the connecting part 151a and 152a where the linear members 153 is coupled in the lengthwise direction of the battery cells 10 and is alternately disposed with the connecting part 151a and 152a.

The first and second lateral members 151 and 152 fix the lateral side of the battery cells 10, are connected to the linear members 153, and function as an inlet or outlet (refer to U1 and U2 in FIG. 3) of the heat transmission medium passing between the battery cells 10 and the linear members 153. Thus, the first or second lateral member 151 or 152 includes the connecting part 151a and 152a and the opening 151b and 152b. The opening 151 b and 152b may include a plurality of holes spaced in the lengthwise direction of the first or second lateral member 151 or 152. Here, the opening 151b and 152b may include rectangular holes. The opening 151b and 152b is formed between the connecting parts 151b and 152b in the first and second lateral members 151 and 152, and has the rectangular holes to increase heat exchange efficiency of the battery cells 10 and to maintain the structure of the barrier 150.

Hereinafter, other exemplary embodiments of the present invention will be described with reference to FIGS. 5A to 8B. Except for the following description, descriptions with reference to FIGS. 5A to 8B are similar to those described above with reference to FIGS. 1 to 4B, and thus are not repeated.

Figure 5A:
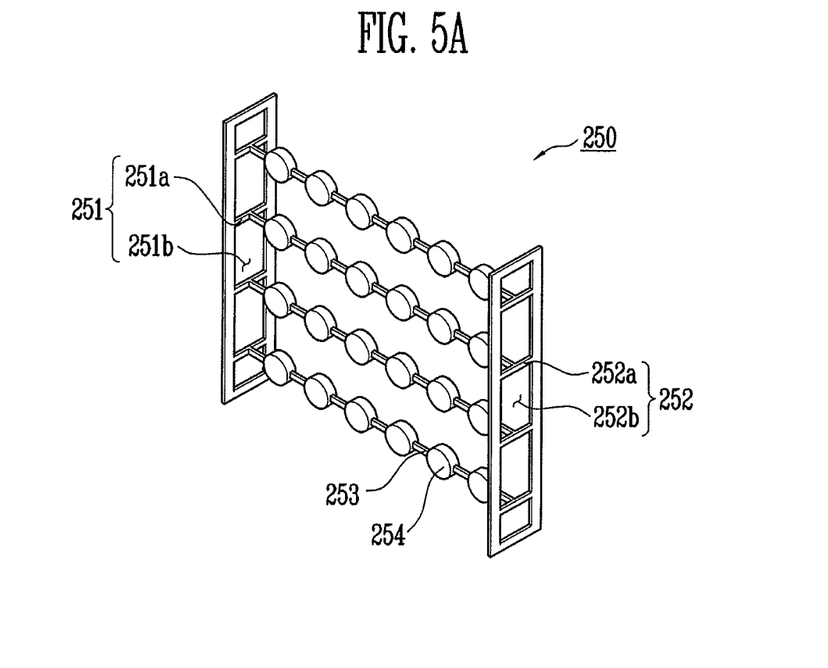
FIG. 5A is a perspective view of a barrier according to another exemplary embodiment of the present invention.
Figure 5B:
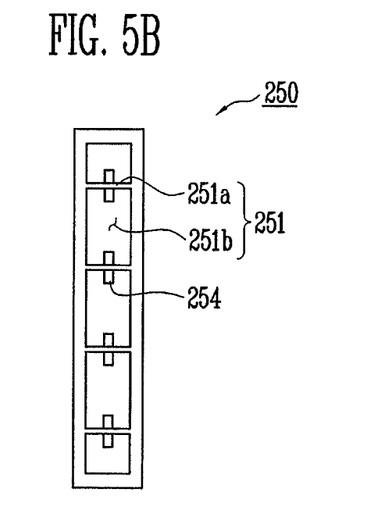
FIG. 5B is a lateral view of the barrier of FIG. 5A.

FIG. 5A is a perspective view of a barrier according to another exemplary embodiment of the present invention, and FIG. 5B is a lateral view of the barrier according to the other exemplary embodiment of the present invention.

Referring to FIGS. 5A and 5B, the barrier 250 may include a linear member 253 having at least one protrusion 254 and a first or second lateral member 251 or 252 connected to the linear member 253. The first or second lateral member 251 or 252 may include a connecting part 251a and 252a connected and coupled to the linear member 253, and an opening 251b and 252b disposed between the connecting parts 251a and 252a.

The opening 251b and 252b may function as an inlet or outlet of the heat transmission medium, and thus the opening 251b and 252b may have a larger size to improve heat exchange efficiency of the battery cells. In other words, the connecting part 251a and 252a has a relatively smaller area in order to increase the size of the opening 251b and 252b. Thus, a thickness of the linear member 253 is reduced to decrease the area of the connecting part 251 a and 252a which is coupled to the linear members 253, and an area of the linear members 253 located between the battery cells and the barrier 250 is minimized to increase a contact area of the battery cells with the heat transmission medium. Further, in the present embodiment, due to a reflective effect of increasing the size of the opening 251b and 252b, a size of the connecting part 251a and 252a and a size of the linear members 253 are reduced, so that the battery module may become lighter.

Figure 6A:
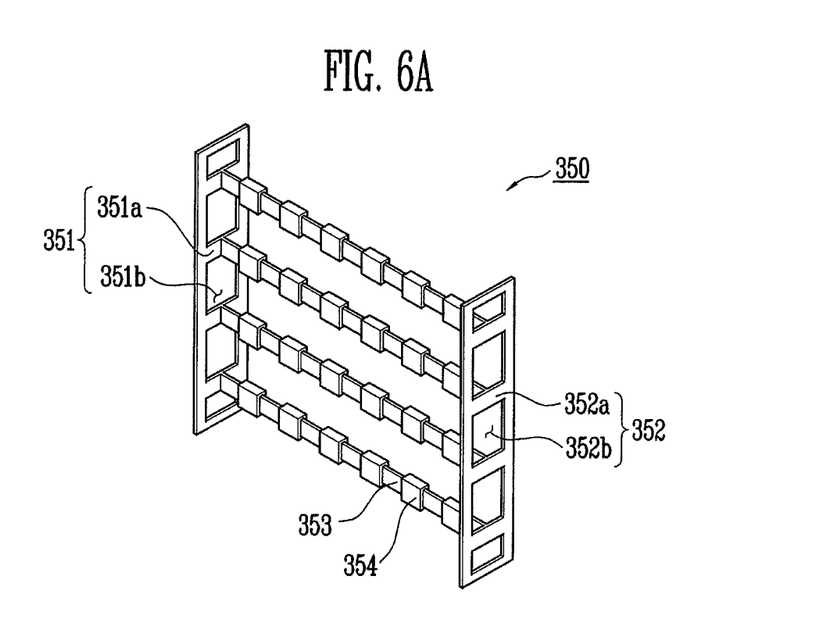
FIG. 6A is a perspective view of a barrier according to sill another exemplary embodiment of the present invention.
Figure 6B:
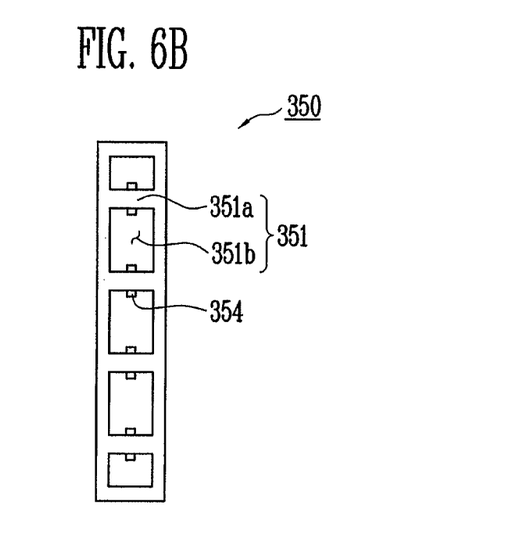
FIG. 6B is a lateral view of the barrier of FIG. 6A.

FIG. 6A is a perspective view of a barrier according to still another exemplary embodiment of the present invention, and FIG. 6B is a lateral view of the barrier according to the other exemplary embodiment of the present invention.

Referring to. FIGS. 6A and 6B, the barrier 350 may include a linear member 353 and a first or second lateral member 351 or 352 including a connecting part 351a and 352a connected to the linear member 353 and an opening 351b and 352b. The linear member 353 may include at least one protrusion 354.

The protrusion 354 may be formed to project from the linear member 353 and be in direct contact with the battery cells. The protrusion 354 effectively spaces the battery cells and is in surface contact with adjacent battery cells to stably maintain an interval from the battery cells. The protrusion 354 may be formed in a round or polygonal tube, and is formed, for example, in a polygonal tube in the present embodiment.

Figure 7A:
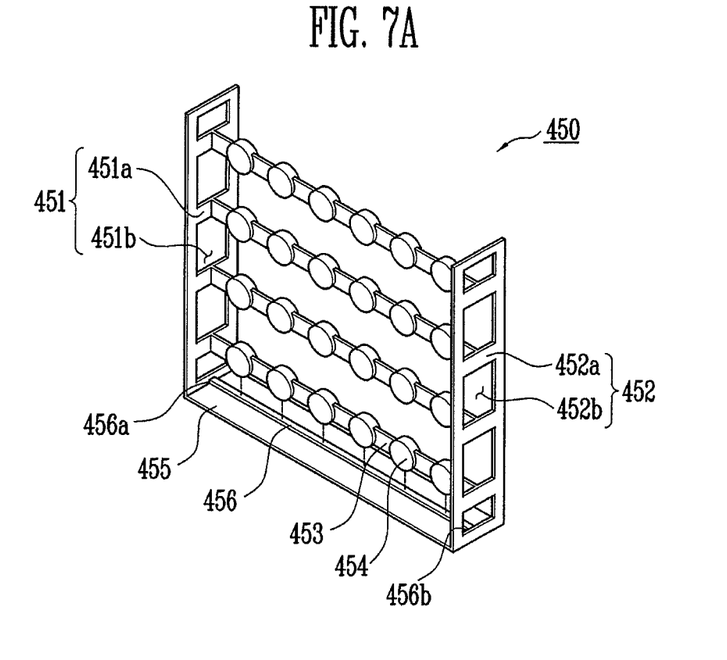
FIG. 7A is a perspective view of a barrier according to yet another exemplary embodiment of the present invention.
Figure 7B:
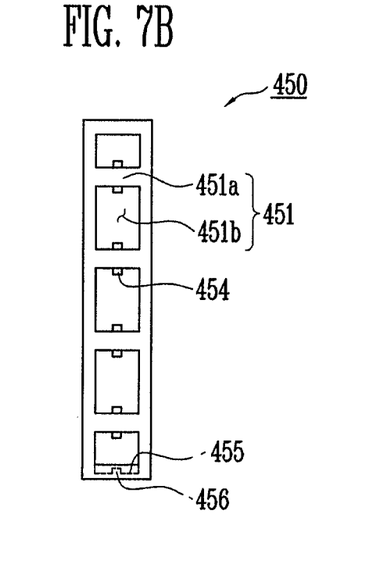
FIG. 7B is a lateral view of the barrier of FIG. 7A.

FIG. 7A is a perspective view of a barrier according to yet another exemplary embodiment of the present invention, and FIG. 7B is a lateral view of the barrier according to the other exemplary embodiment of the present invention.

Referring to FIGS. 7A and 7B, the barrier 450 may include a linear member 453 having at least one protrusion 454 and a first or second lateral member 451 or 452 connected to the linear member 453. The first or second lateral member 451 or 452 may include a connecting part 451a and 452a connected and coupled to the linear members 453, and an opening 451b and 452b functioning as a path of the heat transmission medium. Further, the barrier 450 may further include a lower member 455 connecting the first and second lateral members 451 and 452 and formed corresponding to a bottom side of the battery cells.

The lower member 455 may be formed to extend from the first and second lateral members 451 and 452 and have the same width as the first and second lateral members 451 and 452. The lower member 455 is located generally corresponding to the bottom side of the battery cells and supports the bottom side of the battery cells to securely fix the battery cells. Further, the lower member 455 connects the first and second lateral members 451 and 452 to strengthen the structural integrity of the barrier 450.

The lower member 455 may further include a guide part 456 projecting upwards along a central portion of the lower member 455. The guide part 456 is oriented generally parallel with the linear member 453 and connects one end portion of the first lateral member 451 to one end portion of the second lateral member 452.

The lower member 455 of the barrier 450 accommodates bottom sides of neighboring battery cells spaced by the linear member 453, and the battery cells are spaced from each other at an interval by the linear member 453 having the protrusion 454. Here, the guide part 456 formed on the lower member 455 guides the bottom sides of the neighboring battery cells and stably fixes the battery cells against external force, such as vibrations.

In addition, the guide part 456 is formed approximately in the central portion of the lower member 455, wherein one end 456a of the guide part 456 is in contact with one end portion of the first lateral member 451, and another end 456b thereof is in contact with one end portion of the second lateral member 452. The guide part 456 is oriented to connect the first and second lateral members 451 and 452, thereby stably fixing the bottom side of the battery cells.

Figure 8A:
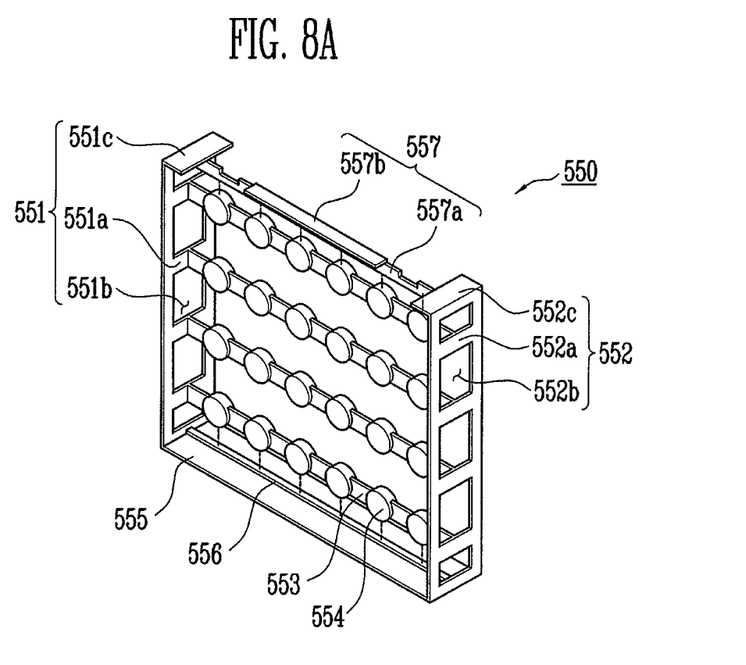
FIG. 8A is a perspective view of a barrier according to still another exemplary embodiment of the present invention.
Figure 8B:
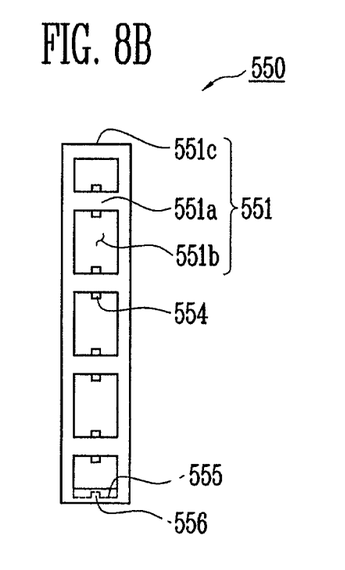
FIG. 8B is a lateral view of the barrier of FIG. 8A.

FIG. 8A is a perspective view of a barrier according to still another exemplary embodiment of the present invention, and FIG. 8B is a lateral view of the barrier according to the other exemplary embodiment of the present invention.

Referring to FIGS. 8A and 8B, the barrier 550 may include a linear member 553 having at least one protrusion 554 and a first or second lateral member 551 or 552 connected to the linear member 553. The first or second lateral member 551 or 552 may include a connecting part 551a and 552a and an opening 551b and 552b. Further, the barrier 550 may further include a lower member 555 connecting the first and second lateral members 551 and 552 and formed corresponding to the bottom sides of the battery cells. The lower member 555 may further include a guide part 556 guiding the bottom sides of neighboring battery cells to a position.

In the barrier 550 of the present embodiment, the first or second lateral member 551 or 552 may be formed to generally correspond to a lateral side of the battery cells and include an edge fixing part 551c and 552c bent at an upper edge of the battery cells and extending to cover part of the cap assembly of the battery cells. The edge fixing parts 551c and 552c fix opposite upper edges of the battery cells. Thus, the barrier 550 is oriented to cover the opposite lateral sides of the battery cells, the bottom sides of the battery cells, and at least part of the cap assembly, thereby securely fixing the battery cells so as not to significantly vibrate by external force.

Further, the barrier 550 may further include an upper member 557 connecting the first and second lateral members 551 and 552 and formed corresponding to the battery cells. In detail, the upper member 557 is formed to extend between the opposite edge fixing parts 551c and 552c extending from the first and second lateral members 551 and 552, and the barrier 550 may have a rectangular frame shape including the linear member 553 therein.

The upper member 557 may include a supporting part 557a oriented parallel with the linear member 553 and being in contact with an upper side of the battery cells connected to the cap assembly and a flange 557b bent approximately in a central portion of the supporting part 557a.

The supporting part 557a has an approximately similar thickness to the linear member 553 and is arranged and spaced from the linear member 553. Thus, one end of the supporting part 557a extends from the edge fixing part 551c of the first lateral member 551, and another end of the supporting part 556a is connected to the edge fixing part 552c of the second lateral member 552. The supporting part 557a is arranged substantially parallel with the guide part 556 formed in the lower member 555 and is located between neighboring battery cells.

The flange 557b bent approximately in the central portion of the supporting part 557a may be located corresponding to the cap assembly of the battery cells. As described above, the cap assembly may include various components, such as the positive terminal, the negative terminal, or the like. The flange 557b is formed to correspond to a shape of the cap assembly and to not interfere with the components based on shapes of the components in the cap assembly. The supporting part 557a of the upper member 557 is connected to the opposite edge fixing parts 551c and 552c to improve strength of the barrier 550 and to support the flange 557b to extend. Thus, the flange 557b presses the cap assembly of the battery cells downwards to securely fix the battery cells.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
   a plurality of battery cells;
   a barrier located between, adjacent ones of the battery cells, the barrier comprising:
   a first lateral member having an opening;
   a second lateral member having an opening, wherein the first and second lateral members have a width; and
   a plurality of bridges extending from the first lateral member to the second lateral member in a central position with respect to the width of the first lateral member and the second lateral members, wherein at least three of the bridges are substantially equally spaced from a respective adjacent bridge along a length of the first and second lateral members; and
   a housing accommodating the battery cells and the barrier, wherein each of the bridges has at least one protrusion, and wherein a thickness of the at least one protrusion is greater than a thickness of the bridge from which it protrudes.

2. The battery module of claim 1, wherein a height of the at least one protrusion is greater than a height of the bridge from which it protrudes.

3. The battery module of claim 1, wherein the at least one protrusion is generally disc-shaped or polygonal.

4. The battery module of claim 1, wherein the first and second lateral members have a flat surface overlapping an edge of each adjacent battery cell.

5. The battery module of claim 1, wherein the plurality of bridges are spaced from each other along the first and second lateral members.

6. The battery module of claim 1, wherein the openings on the first and second lateral members are spaced from the bridge.

7. The battery module of claim 1, wherein the first and second lateral members each have a plurality of openings.

8. The battery module of claim 1, wherein the barrier further comprises a lower member extending between the first and second lateral members and wherein the lower member overlaps with a bottom surface of adjacent ones of the battery cells.

9. The battery module of claim 8, wherein the lower member includes a guide protruding along a length of the lower member, wherein the guide is located between adjacent ones of the battery cells.

10. The battery module of claim 9, wherein the guide member substantially bisects the lower member.

11. The battery module of claim 8, wherein a width of the lower member is substantially equal to a width of the first and second lateral members.

12. The battery module of claim 1 further comprising an upper member and extending between the first and second lateral members, the upper member comprising a support coupled to the first and second lateral members and a flange protruding from the support and configured to overlap with a cap assembly of adjacent ones of the battery cells.

13. The battery module of claim 1, wherein the first and second lateral members each further comprise an edge fixing portion extending from an edge of each respective lateral member toward the battery cells and which overlap with a portion of the cap assembly.

14. The battery module of claim 1, wherein a length of the bridge is substantially equal to a width of one of the battery cells.

15. The battery module of claim 1, wherein the housing comprises a pair of end plates located on opposite ends of the battery cells and connecting members coupled to and extending between the pair of ends plates.

16. A battery module comprising:
    a plurality of battery cells;
    a barrier located between adjacent ones of the battery cells, the barrier comprising:
    a first lateral member having an opening;
    a second lateral member having an opening, wherein the first and second lateral members have a width; and
    a plurality of bridges extending from the first lateral member to the second lateral member in a central position with respect to the width of the first lateral member and the second lateral member, wherein at least three of the bridges are substantially equally spaced from a respective adjacent bridge along a length of the first and second lateral members, wherein a height of the bridges is less than the length of the first and second lateral members; and
    a housing accommodating the battery cells and the barrier, wherein each of the bridges has at least one protrusion, and wherein a thickness of the at least one protrusion is greater than a thickness of the bridge from which it protrudes.

* * * * *